United States Patent [19]

Kennedy et al.

[11] Patent Number: 5,302,799
[45] Date of Patent: Apr. 12, 1994

[54] WELD ANALYSIS AND CONTROL SYSTEM

[75] Inventors: Larry Z. Kennedy; Michael H. Rodgers, both of Huntsville; Bradley W. Powell, Athens; Ivan A. Burroughs, Gurley; K. Wayne Goode, Madison, all of Ala.

[73] Assignee: Applied Research, Inc., Huntsville, Ala.

[21] Appl. No.: 803,575

[22] Filed: Dec. 9, 1991

[51] Int. Cl.$^5$ .............................................. B23K 9/127
[52] U.S. Cl. .............................. 219/124.34; 219/125.1
[58] Field of Search ...................... 219/124.34, 124.22, 219/125.11, 125.1

[56] References Cited

U.S. PATENT DOCUMENTS

| | | | |
|---|---|---|---|
| 4,390,775 | 6/1983 | Biava et al. | 219/124.34 |
| 4,916,286 | 4/1990 | Sarugaku et al. | 219/124.34 |
| 4,920,249 | 4/1990 | McLaughlin et al. | 219/124.34 |
| 4,969,107 | 11/1990 | Mizutani | 219/124.34 |

FOREIGN PATENT DOCUMENTS 57-202980 12/1982 Japan ................................. 219/125.1

*Primary Examiner*—Clifford C. Shaw
*Attorney, Agent, or Firm*—John C. Garvin, Jr.; James E. Staudt

[57] ABSTRACT

The invention is a Weld Analysis and Control System developed for active weld system control through real time weld data acquisition. Closed-loop control is based on analysis of weld system parameters and weld geometry. The system is adapted for use with automated welding apparatus having a weld controller which is capable of active electronic control of all aspects of a welding operation. Enhanced graphics and data displays are provided for post-weld analysis.

The system provides parameter acquisition, including seam location which is acquired for active torch cross-seam positioning. Torch stand-off is also monitored for control. Weld bead and parent surface geometrical parameters are acquired as an indication of weld quality. These parameters include mismatch, peaking, undercut, underfill, crown height, weld width, puddle diameter, and other measurable information about the weld puddle regions, such as puddle symmetry, etc. These parameters provide a basis for active control as well as post-weld quality analysis and verification. Weld system parameters, such as voltage, current and wire feed rate, are also monitored and archived for correlation with quality parameters.

15 Claims, 5 Drawing Sheets

WELD ANALYSIS AND CONTROL SYSTEM

ORIGIN OF THE INVENTION

The invention described herein was made in the performance of work under a NASA contract, Contract NA58-36200 and is subject to the provisions of Section 305 of the National Aeronautics and Space Act of 1958, Public Law 85-568 (72 Stat. 435; 42 U.S.C. 2457).

FIELD OF THE INVENTION

The invention is a Weld Analysis and Control System developed for active weld system control through real time weld data acquisition, and for retaining quality verification documentation which reflects the actual welding process as it was performed.

DESCRIPTION OF RELATED ART

The following listing of U.S. Patents are examples of related prior art: U.S. Pat. Nos. 3,609,288 to Sciaky; 4,016,396 to Hassan et al.; 4,501,950 to Richardson; 4,567,348 to Smith et al.; 4,590,356 to Povlick; 4,667,082 to Shivata et al.; 4,737,614 to Richardson; 4,831,233 to Gordon; and 4,833,381 to Taft et al. Review of the related art reveals welding systems which obtain some of the broad results realized by the present invention. However, it is immediately apparent that in each case the results are accomplished in totally different ways from those of the present invention which utilizes new and improved apparatus with equally new and improved techniques. It is further clear that no system of the prior art is capable of performing an array of tasks to equal those performed by the present invention. Nor are the prior art patents capable of duplicating the speed and accuracy achieved by the present invention.

SUMMARY OF THE INVENTION

The invention is a Weld Analysis and Control System developed for active weld system control through real time weld data acquisition. Closed-loop control is based on analysis of weld system parameters and weld geometry. The system is adapted for use with automated welding apparatus having a weld controller which is capable of active electronic control of all aspects of a welding operation. Enhanced graphics and data displays are provided for easy operator understanding and for post-weld analysis. Statistical Process Control techniques are readily developed with this system.

The system is specifically designed for those welds which require, not only quality, but documented quality.

The system has been developed for use in manufacturing components such as the space shuttle external tank wherein long continuous runs of high quality welds are required. Such applications commonly utilize advanced welding techniques such as Variable Polarity Plasma Arc (VPPA), Tungsten Inert Gas (TIG), Plasma Arc Weld (PAW) and Metal Inert Gas (MIG).

The invention is a system of sensors with signal processing and control algorithms implemented on a multiprocessor platform which is interfaceable with a weld controller through a serial link.

This system provides:

pre-weld and post-weld sensors for torch motion control and weld bead quality assessment;

weld parameter and bead geometry parameter acquisition for real-time adaptive control and/or Statistical Process Control (SPC) analysis;

signal processing and control algorithms implemented on a multiprocessor platform for enhanced response rates; and enhanced real-time graphics of weld status and weld history for easy operator assessment.

The sensors utilized in this system acquire imagery for seam tracking as well as for weld bead and weld piece analysis. Control updates include torch cross-seam position, stand-off and orientation. Weld system and weld bead profile parameters are also monitored and measured as real-time control diagnostics, as well as for post-weld analysis.

The sensors which are employed have been developed for this system through several generations and include adaptive features in software and hardware in order to maximize response under varying conditions.

A weld bead profiling sensor is included in the system. This profiling sensor may be utilized as a pre-weld sensor for the seam tracking of grooved joints as well as a post-weld sensor for weld bead quality assessment through measurement of weld bead geometrical parameters. This device is the subject of a copending U.S. Patent Application titled "WELD BEAD PROFILOMETER", which was filed on Sep. 26, 1991 and bears application Ser. No. 07/765,880. This copending application is incorporated herewith by reference. This sensor also provides input to a control loop for undercut correction in Plasma Arc Welding. The sensor employs highly effective optical noise rejecting techniques and can generate up to thirty updates per second, depending upon the nature of the surface. Measurement/tracking accuracies usually achieved are plus or minus five thousandths of an inch.

A stereo seam track sensor, designed for this system is capable of tracking tight butt joint seams with no profile as well as second pass welds wherein a profile has been created.

It is understood that indicia of any type whether it be a hole, a dot, a line, a seam or any visible marking which is located on the surface of a workpiece and within the simultaneous viewing of the stereo seam tracker will be quantitatively locatable in three dimensions by the seam tracker. It is apparent that indicia such as a line or seam has no profile with respect to the surface of the workpiece upon which the indicia is located. Stated another way, such indicia may best be described as being substantially coincident with the surface contour of the workpiece upon which it is formed. This device is the subject of a copending U.S. Patent Application titled "STEREO OPTICAL GUIDANCE SYSTEM FOR CONTROL OF INDUSTRIAL ROBOTS" which was filed on Aug. 27, 1990 and bears application Ser. No. 07/573,357. This copending application is incorporated herewith by reference. This sensor utilizes two modes of self-contained illumination. The sensor can also provide motion control by determining XYZ coordinates of a designated point in image space. On weld systems, tracking accuracies are usually plus or minus five thousandths of an inch.

It should be noted that while both the weld bead profiling sensor and the stereo seam track sensor are capable of tracking a seam, only the latter is capable of tracking butt seam joints having no profile.

The present invention provides a complete range of parameter acquisition, including seam location which is acquired for active torch cross-seam positioning. Torch stand-off is also monitored for control. Weld bead and parent surface geometrical parameters are acquired as an indication of weld quality. These parameters include mismatch, peaking, undercut, underfill, crown height, weld width, puddle diameter, and other measurable information about the weld puddle region, such as puddle symmetry, etc. These parameters provide a basis for active control as well as post-weld quality analysis and verification. Weld system parameters, such as voltage, current and wire feed rate, are also monitored and archived for correlation with quality parameters.

The system includes special signal processing and control software for weld piece imagery information extraction and motion control. A parallel multiprocessor architecture with dedicated processors for each sensor and for control is utilized. This arrangement has been available on an Industry Standard Architecture (ISA) bus, with specially developed Shared Memory Interface between processors, and can also utilize a Versa Module Europe (VME) bus for enhanced performance. These processors also generate highly functional graphics. It is pointed out that shared memory is a region of memory that is accessible by two or more processors. On the ISA bus, each processor must be on a separate bus, therefore special hardware is required to use shared memory on the ISA bus. Accordingly, with the example used to illustrate this invention special hardware is utilized. However, it is understood that similar hardware is commercially available. For example, on a VME bus more than one processor may be on each bus. Thus, no special hardware is required for such an application.

The system includes enhanced real-time graphics wherein geometry parameters are optionally displayed to make apparent current weld status, as well as performance from the beginning of the weld. For example, tracker and profiler video are available, along with displays verifying the information validity. Color screens of tracking status and history, and other parameters such as undercut asymmetry are displayed, along with the current profile parameters. Linear plots of weld parameters versus weld position are plotted on the same frame for visual correlation with one another. Finally, weld and geometry parameters can be overlayed on a profiler video recording as an additional means of post-weld analysis. These displays are intended to cover the spectrum of information requirements for understanding what is happening in real-time, as well as for post-weld analysis.

DESCRIPTION OF PREFERRED EMBODIMENTS

Figure 1:
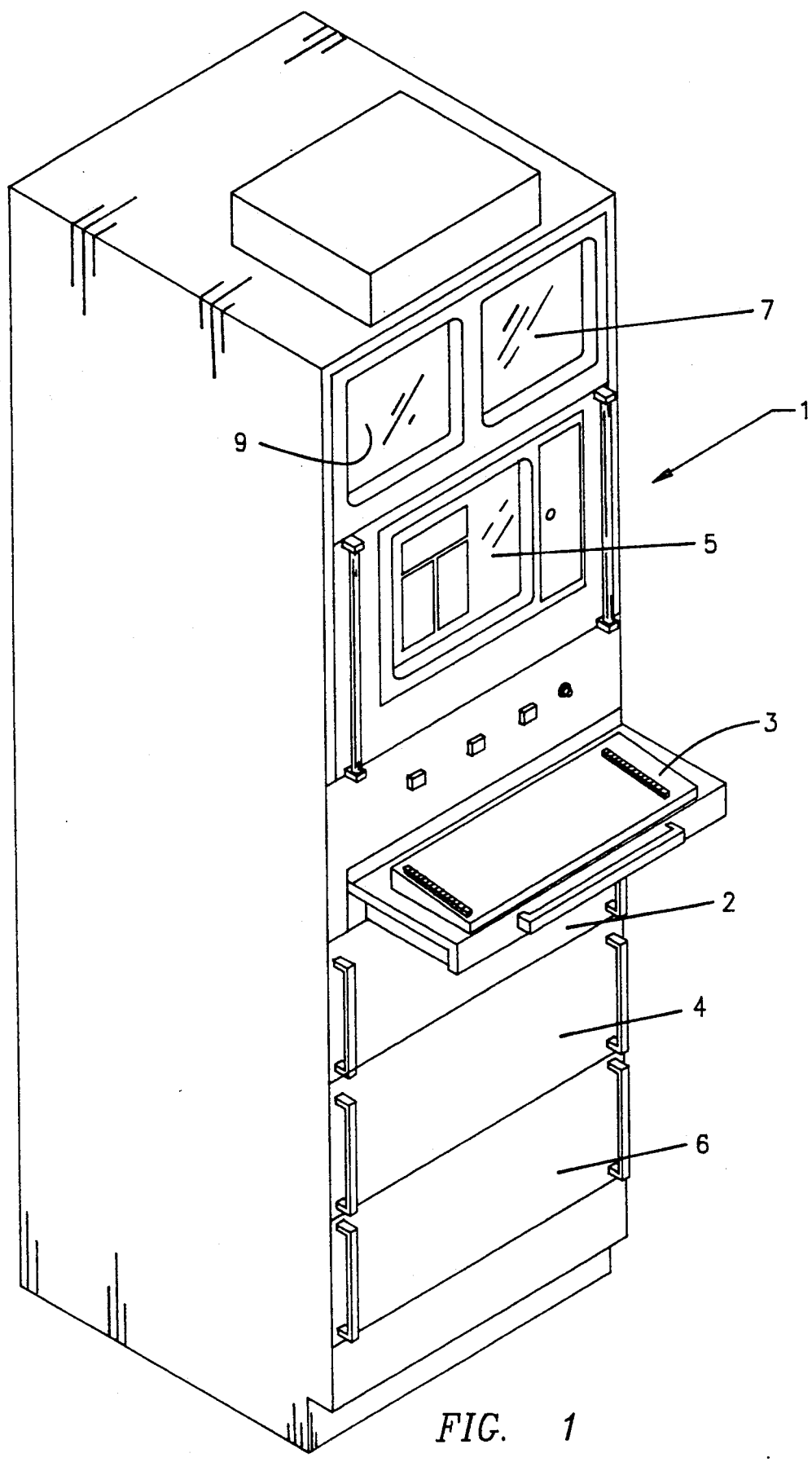
FIG. 1 shows the operator station for the system including data input and storage devices as well as video monitors for display of selected information relating to the welding operation.

Referring now to FIG. 1 is the control station of the weld analysis and control system which is the subject of this invention is designated generally by the reference numeral 1. The control station 1 houses much of the electronics of the system and includes a keyboard 3, a computer video display 5, and profiler and tracking video displays 7 and 9 respectively. Miscellaneous power controls are also mounted on the control station. The keyboard 3 is utilized to enter selected data relating to the configuration of the desired weld which the operator wishes to form, as well as to send command signals to the welding apparatus. Compartments 2, 4, and 6 contain electronics for a host processor, a stereo seam tracker processor and a profiler processor, respectively.

Figure 2:
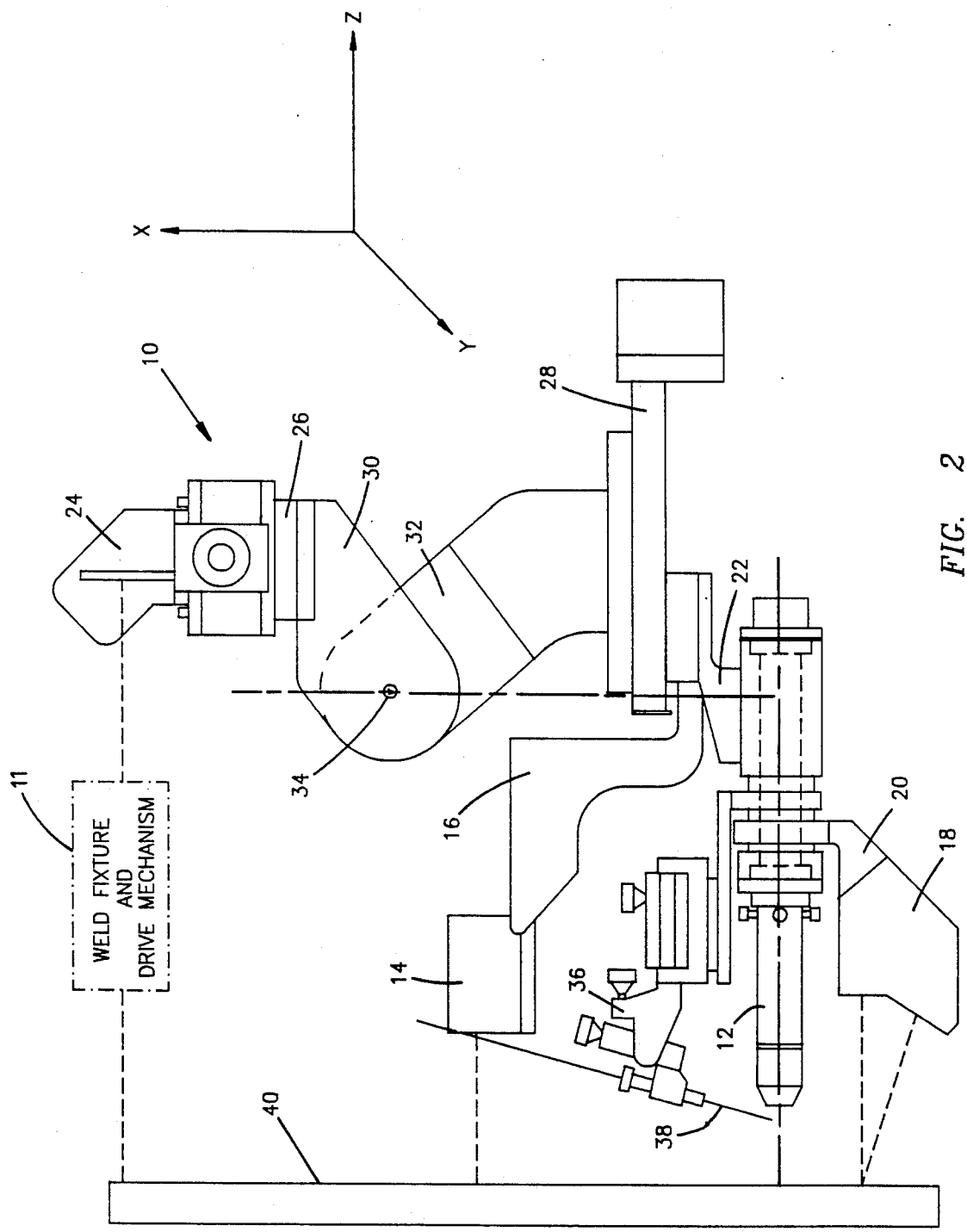
FIG. 2 is an elevational view of a welding apparatus illustrating mounting and controlling devices for the sensors, the torch and related assemblies.

FIG. 2 shows a mechanical welding apparatus, designated generally by the reference numeral 10, of an automatic torch welding assembly. This drawing illustrates the mounting relationship of the components of the welding apparatus to the analysis and control system sensors which are attached thereto. This welding apparatus is capable of controlling the movement of a torch 12 in three dimensions as well as having the capability to rotate the torch about its own axis. A stereo vision seam tracker 14, which is mentioned above, as the subject of a copending patent application, is attached to the welding apparatus by a mounting assembly 16. A profiler sensor 18 which is also mentioned above as being the subject of a copending patent application, is mounted to the welding apparatus by a mount 20. The torch 12 is rotatably mounted to the welding apparatus by a torch mount assembly 22, which also houses a torch rotating motor assembly (not shown). An interface mount assembly 24 of the welding apparatus 10 is attached to a standard weld fixture and drive mechanism 11 (diagrammatically shown) to a workpiece 40. This mechanism controllably guides the welding apparatus along the desired weld track. A cross slide assembly 26 is provided to accomplish controlled lateral movement of the torch, while a similar axial control assembly 28 is provided to accomplish axial movement of the torch, that is to say the movement of the torch toward or away from a workpiece 40 which is to be welded. In this way the optimum distance (standoff) between the torch and the workpiece is maintained. The assemblies 26 and 28 are attached to one another by arms 30 and 32 respectively which are attached at 34. A wire guide assembly 36 is mounted adjacent the torch 12 and functions to add material to a weld, if needed, by controllably feeding the wire 38 into the area of a weld being formed on workpiece 40.

The stereo seam tracker 14 utilized by this system is capable of tracking tight butt joint seams with no profile as well as second pass welds which include a profile. The sensor of this device provides signals for motion control by determining three dimensional coordinates of a designated point in image space. Tracking accuracies are usually plus or minus five thousandths of an inch.

The weld bead profiler 18 may function as a pre-weld sensor for the seam tracking of grooved joints as well as a post-weld sensor for weld bead quality assessment through measurement of weld bead geometrical parameters. It is also used as input to a control loop for undercut correction in plasma arc welding. This sensor employs highly effective optical noise rejecting techniques and can generate up to thirty updates per second, depending upon the nature of the surface. Tracking accuracies usually achieved are plus or minus five thousandths of an inch. It is pointed out that the profiler could well be used for tracking, in place of the stereo sensor 14 in situations wherein the seam to be tracked has a profile, rather than a smooth butt joint.

Figure 3:
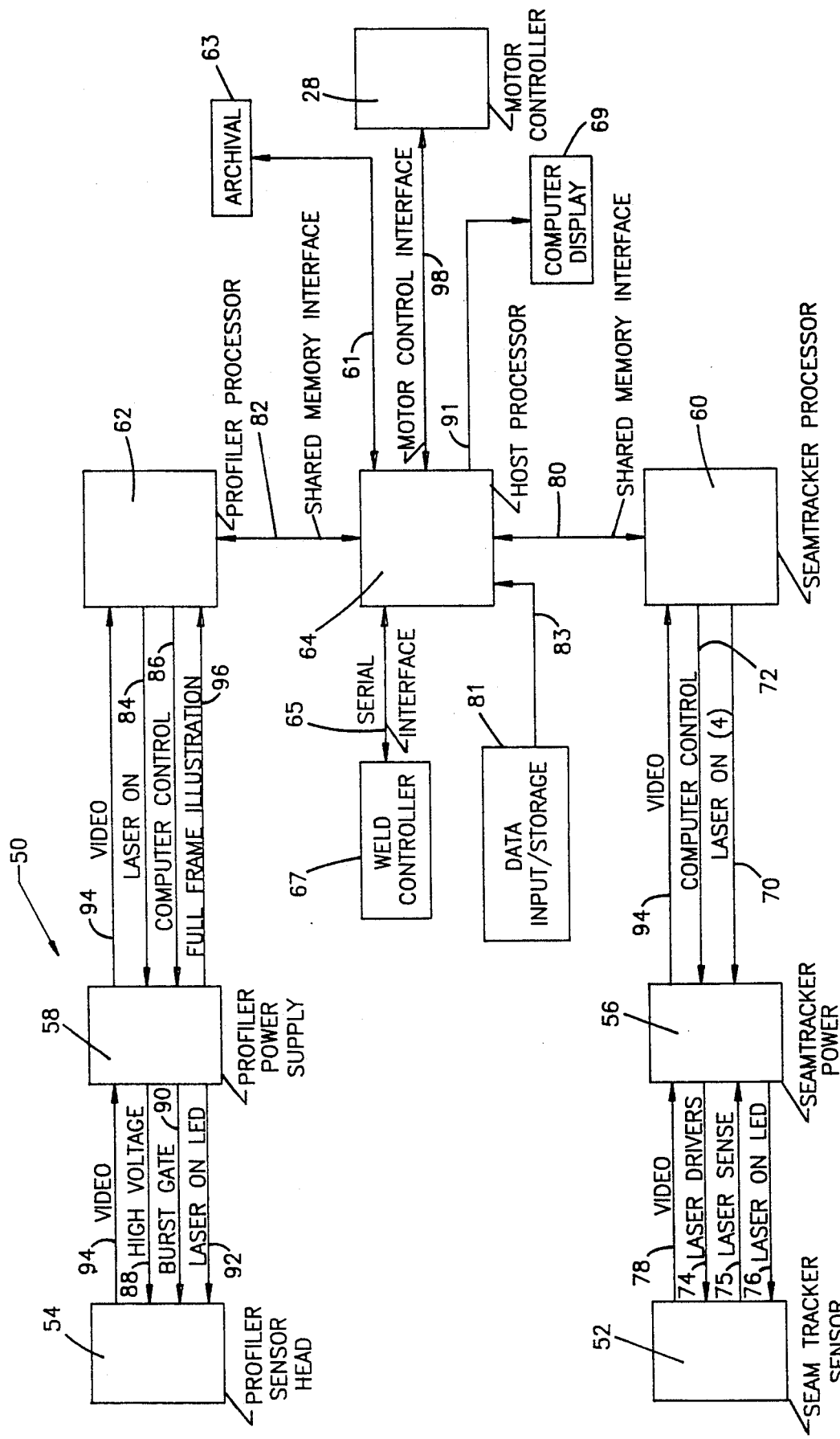
FIG. 3 is a block diagram illustrating the flow of power and communication between the primary components of the system.

Referring now to FIG. 3, the major command and control components of the weld analysis and control system are shown in block form so as to illustrate the communication networks and supply lines between each component. The system is designated generally by reference numeral 50. The system includes a seamtracker sensor head 52 and a profiler sensor head 54 which are located within the seamtracker 14 and the profiler 18 respectively as illustrated in FIG. 2. In general terms, the seamtracker sensor head 52 and the profiler sensor head 54 communicate with power supplies 56 and 58 respectively which in turn communicate with processors 60 and 62 respectively. Each processor 60 and 62 communicates through a shared memory interface 80 and 82 respectively with a host processor 64, which in turn communicates with a motor controller 28, a weld controller 67, an archival repository and reproduction device 63, a computer display 69 and a data input/storage device 81.

A more specific item by item description of the communication between the primary components illustrated in the block diagram of FIG. 3 is provided hereinafter.

SEAMTRACKER SENSOR HEAD—The seamtracker power supply box 56 has inputs from the seamtracker processor 60, a laser "on" signal which is carried by communication line 70 for each of four lasers utilized in the seamtracker 14 and a computer control signal which is carried by line 72. Depending on the type of algorithm being used, the processor 60 needs to turn "on" and "off" each of the four different lasers. One global laser provides a general illumination of the weld area, while a linear laser provides a structured stripe of intense light which is precisely directed to the indicia to be followed by the seamtracker head. Each laser "on" signal turns one laser "on" and "off". The computer control signal must be turned "on" for the laser "on" signals to work. These signals are standard transistor-transistor logic signals.

Similarly the seamtracker power supply box 56 has an output carried by line 74 to the seamtracker's sensor head to drive each laser. A laser "on" Light Emitting Diode (LED) signal which is carried by line 76 illuminates a LED (not shown) on the sensor head to indicate when a laser is "on". A photodetector with each laser returns a signal on line 75 from the seamtracker sensor head indicating when the laser is on.

An image or video signal is returned through line 78 from the seamtracker sensor head to a camera in the seamtracker power supply box. The camera returns the video signal through line 94 to the seamtracker processor 60.

SEAMTRACKER PROCESSOR—The seamtracker processor 60 acquires the video signal from the seamtracker sensor head 52 and uses it to determine the location of the weld seam. This information is passed to the host processor 64 through the shared memory interface 80. The host processor uses this information to determine the correct placement of the torch and uses the motor controller to set the correct position of the torch. The host processor also communicates through a two way serial interface 65 with a weld controller 67. The weld controller controls such functions as wire feed, gas flow, arc-voltage, etc., which relate directly to the forming of a weld. Thus, the control system provides information to the weld controller which permits instantaneous "active" control over the welding process as it is performed.

PROFILER SENSOR HEAD—The profiler power supply box 58 has two inputs from the profiler processor 62, laser "on" line 84 and computer control line 86. The laser "on" signal turns the laser "on" and "off". The computer control signal 86 must be "on" for the laser signals to operate. These are transistor-transistor logic signals.

When the laser is "on" it is not continuously on. Power is delivered to it in several short bursts once for each field of video. The power to the laser is delivered through the high voltage connection line 88. The burst gate signal, which passes through line 90, turns each burst "on" and "off". The laser "on" LED signal which passes through line 92 illuminates a LED (not shown) on the sensor head 54 to indicate when the laser is "on".

An image or video signal is returned on line 94 from the profiler sensor head to a camera in the profiler power supply box. Camera electronics within the profiler power supply 58 return a video signal also on line 94 to the profiler processor 62. The full frame illumination signal, which passes from the profiler power supply 58 to the profiler processor 62 through line 96, indicates that the lasers have fired and that the next frame of video should be acquired.

PROFILER PROCESSOR—The profiler processor 62 acquires the video signal through line 94 from the profiler sensor head 54 and uses it to calculate the shape of the weld profile. Using this information, it determines whether or not the weld is cutting to one side or the other. If the weld is cutting, the profiler processor determines the amount of torch rotation needed to correct this problem. A more detailed description of this process is provided hereinafter. This information is passed to the host processor 64 through the shared memory interface 82. The host processor 64 then commands the motor controller 28 to rotate the torch. Additionally, data derived from the shape of a weld profile, is used to provide feedback for control of weld system parameters.

SHARED MEMORY INTERFACE—the shared memory interface 80, 82 is used to communicate between the processors. As previously described, this interface is a region of memory that can be accessed by two or more processors in the same way as local memory. Many variables relating to the process are transferred through this interface.

HOST PROCESSOR—The host processor 64 is in two way communication with the profiler and seamtracker processors 62, 60 respectively, the weld and motor controllers 67, 28 respectively. The archival repository and reproduction device 63, sends one way signals to the computer display 69 and receives signals from the data input/storage device 81. A unique capability of this weld analysis and control system is a facility for data archival and reproduction for post weld, nondestructive evaluation. Thus, all critical parameters and operations of the welding apparatus are recorded for selective review after completion of the welding operation. In this way a critical review of the weld operation may be utilized to confirm the quality of the weld, without the usual need for destructive testing. As will be noted, data from the data input/storage device 81 is fed to the host processor via line 83. This device includes the keyboard 3 as well as memory for the storage of weld schedules input from the keyboard.

As indicated in the Summary of the Invention, supra, this Weld Analysis and Control system is compatible with a variety of advanced welding techniques. Of these the Variable Polarity Plasma Arc (VPPA) welding is a state of the art welding process which is typical of the welding processes which are utilized by the system. Accordingly, this process has been selected to illustrate the capabilities of the system as described hereinafter.

Variable Polarity Plasma Arc welding is accomplished when a torch 12, as illustrated in FIG. 2, propels a stream of hot ionized gas through the joint of two pieces of metal (workpiece 40), locally melting them and thereby causing the pieces to fuse together upon resolidification. Simultaneously, filler wire 38 is optionally fed into the molten region to increase the mass and improve the strength of the joint.

Figure 4:
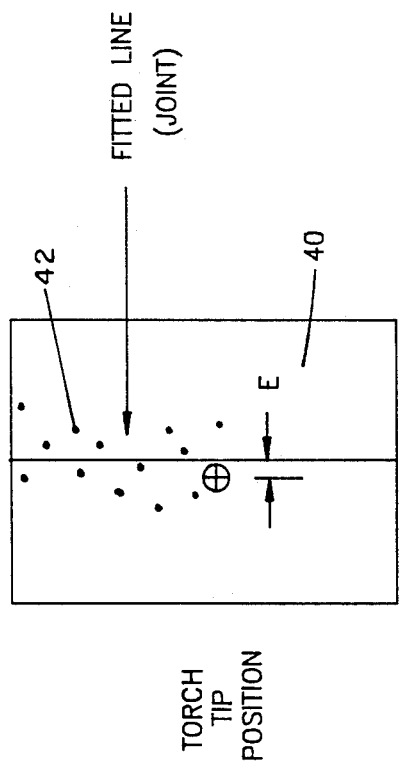
FIG. 4 is an illustration of a series of points which are used by the system to define a tracking line from which tracking errors may be determined and corrected by the system.

Referring now to FIG. 4, it will be understood that the tracking of the system is accomplished as the seamtracker 14 identifies a series of points 42 from which a tracking line may be determined. The data gathered by the stereo vision sensor and control software, determines the position of the torch and then determines which of the seam data points 42 are in the neighborhood of the torch. A least squares line is then fitted to the points. Alternatively, higher degree polynomial can be fitted to the data if the seam is not straight. After the lateral value of the approximating curve or line is determined, it is compared to the actual lateral value of the torch. The difference of these two numbers is the error value (See "E", FIG. 4) fed to a Proportional-Integral-Derivative (PID) control law from which a lateral cross-slide velocity command is calculated. The calculated velocity commands are then sent to the cross-slide motor controller to keep the torch centered on the seam.

Figure 5:
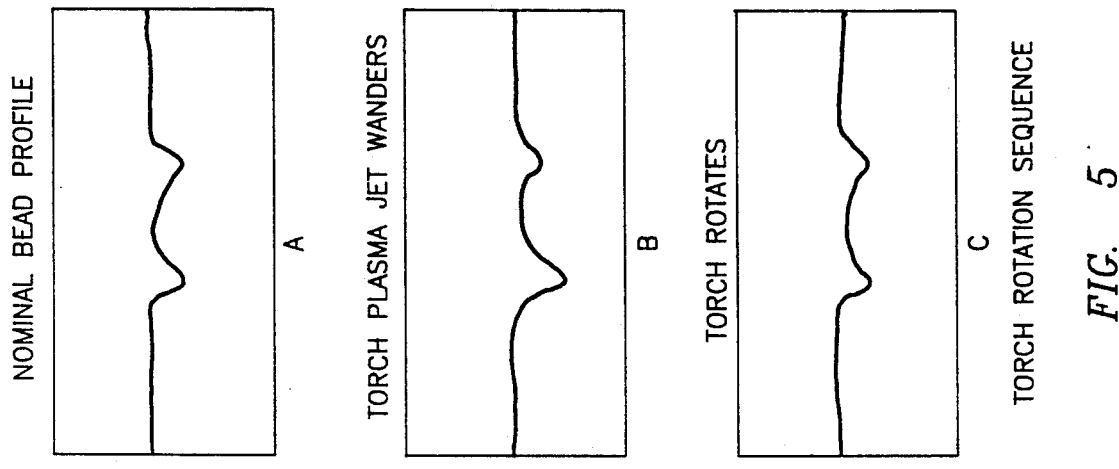
FIG. 5 illustrates a set of three profiles which may occur in a typical welding operation.

Occasionally during the welding process, for reasons which are not clear, the centerline of the jet of plasma issuing from the torch will abruptly change direction by a few degrees. This causes an unevenness in the profile of the molten puddle, and consequently a lack of symmetry in the solidified weld bead. This unevenness is illustrated in FIG. 5 wherein: insert "A" shows a nominal bead profile; insert "B" shows a profile caused by the wandering of the torch plasma jet; and insert "C" shows the profile as having returned to normal after rotation of the torch. Lack of symmetry in the weld bead results in a weaker joint. It has been determined that rotation of the torch will correct this condition. Accordingly, the present system has been provided with the capability to rotate the torch in response to detection by the profiler indicating that the action is necessary. This operation is accomplished by processing the signals from the profiler 18 which are displayed pictorially by the display 102 of FIG. 6 and numerically in display 106 also of FIG. 6. Review of this numerical display illustrates that the left cut is a −0.051 while the right cut is −0.049, which results in a cut delta of 0.002. This information is analyzed by the profile processor 62. An algorithm within the processor 62 provides a torch rotation signal proportional to the amount of the cut delta. Experimentation has shown that the rotational direction which corrects the cut delta is the same for a given weld about eighty percent of the time. If, however, rotation in the favored direction increases the cut delta, then the direction of rotation is immediately reversed so as to eliminate the cut delta. Rotating the torch thus allows the centerline of the plasma to fall evenly with respect to the joint once again.

Figure 6:
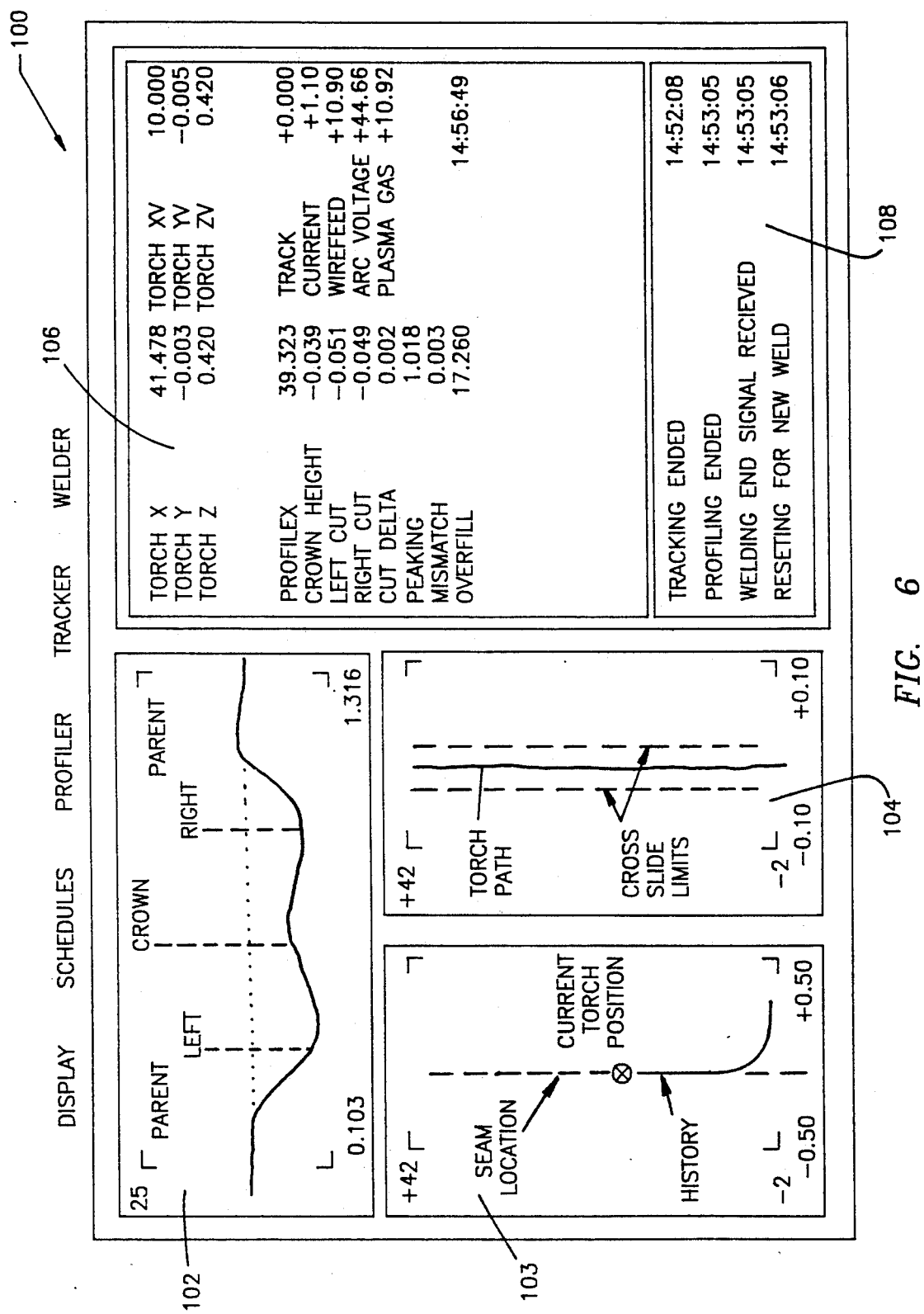
FIG. 6 shows selected video displays of actual weld information in pictorial as well as numerical form and is an illustration of various tracking and welding process information.

Reference is now made to FIG. 6 which is a reproduction of one selected video screen of the various plots and data, which are produced by the control system, depicting real time welding information. The over all display is illustrated generally by reference numeral 100. A plot 102, produced by the profiler portion of the system provides the features indicated. The right and left sides of the profile indicate the blending of the weld with the parent material, while the crown illustrates the configuration of the center portion of the weld. Plot 103 shows with a dashed line, the track points found by the seamtracking portion of the control system. The solid line shows the path which the torch (denoted by an X) has followed. The vertical distance is the distance in the direction of the weld as it is formed. The horizontal axis is the direction across the plate being welded and relates to cross slide distance. System software controls the torch and guides it along the path of the track points. The plot 104 shows line illustrates the actual path of the torch. The vertical axis is the same as in plot 103. Lateral movement of the torch takes place along the horizontal axis. The dashed lines show the limits the torch should stay within. If the torch goes outside these limits the software will actuate the cross slide mechanisms to bring it back within the prescribed limits. It will be noted that critical weld information is recorded in the corners of displays 102, 102 and 104. This information provides a valuable aid in reviewing the quality of a weld. The area depicted by numeral 106 is a numerical display of important information relating to the welding process. At the top is the position and velocity of the torch, and immediately there below are the weld features found by the profiler portion of the system and weld parameters given by the weld control system. The area depicted by numeral 108 displays messages relating to the time of occurrence of various welding operations.

In operation of the system, three main sub-cycles of operation are executed concurrently and repeatedly by the automated welded machinery.

Sub-cycle number 1 (Seem point detection) is the detection and coordinate specification of seam points within the field-of-view of the stereo vision sensor 14. The stereo vision sensor detects seam points ahead of the torch. As each seam point is detected its x, y, z, coordinate values are deposited into data arrays, where the seam tracking control software uses them to calculate graphical displays of the seam path, and send velocity commands to the cross-slide motor controller 28. The stereo vision optics of the seamtracker makes possible the three dimensional specification of the weld seam.

Sub-cycle number 2 (cross slide velocity commands) takes the data gathered by the stereo vision sensor and control software and determines the position of the torch. The calculated velocity commands are then sent to the cross-slide motor controller to keep the torch centered on the seam.

Sub-cycle number 1 (seam point detection) and sub-cycle number 2 (cross slide velocity commands) take care of tracking the seam.

Sub-cycle number 3 (torch rotation) compensates for the wandering of the torch plasma jet, and in addition collects data for graphical and digital display and for the trend analysis of the weld bead geometry. The laser of profiler 18, FIG. 2 illuminates the weld bead with a plane of infrared laser light which intersects the surface of the metal perpendicularly. Imaging the reflected light from the weld bead allows the profiler and its software to determine the y and z coordinates (see FIG. 2) of every point along a cross section of the weld. The "x" coordinate (see FIG. 2) is the same for every point in a particular profile, and is equal to the torch "x" (i.e. vertical) position plus the torch-to-profiler offset distance. Thus, as pointed out in detail above the profiler provides measurements, while the control software obtains a measure of the symmetry of the weld bead, and then determines which direction and by how much the torch should be rotated. The software calculates rotation directions and amounts using experimentally derived heuristics. After commands are calculated and sent to the rotation motor controller, sub-cycle number 3 repeats.

Obviously, numerous modifications and variations of the present invention are possible in light of the above teachings. It is therefore to be understood that within the scope of the appended claims the invention may be practiced otherwise than as specifically described herein.

I claim:

1. A weld analysis and control system for controlling an automated welding apparatus forming a weld within predetermined parameters along an indicia substantially coincident with a surface on a workpiece, said system comprising:
    means for entering and storage of data defining said parameters;
    means for processing said data;
    means for actuation of said welding apparatus in response to said processed data; and
    means for tracking said indicia.

2. A system as set forth in claim 1 wherein said means for actuation of said welding apparatus includes means for tracking said indicia.

3. A system as set forth in claim 2 wherein said means for actuation of said welding apparatus includes means for forming the profile of said weld in accordance with said predetermined parameters.

4. A system as set forth in claim 3 wherein said actuation means and processing means include means for distinguishing the characteristics of said weld as the weld is being formed.

5. A system as set forth in claim 4 wherein said system further includes means to record said characteristics.

6. A system as set forth in claim 5 wherein said system further includes means to selectively display the characteristics of said weld during and after the formation of said weld.

7. A system as set forth in claim 6 wherein the characteristics of the weld include the undercut on each side of said weld.

8. A system as set forth in claim 7 wherein said actuation and processing means includes means to control said welding apparatus so as to equalize the undercut on each side of said weld.

9. A system as set forth in claim 8 wherein said welding apparatus includes a rotatable torch.

10. A system as set forth in claim 9 wherein said undercut on each side of said weld is equalized by rotation of said torch.

11. A system as set forth in claim 6 wherein said means to selectively display the characteristics of said weld include pictorial and numerical displays.

12. A weld analysis and control system which monitors the undercut of a weld as the weld is being formed, and which provides signals indicative of the configuration of said undercut for controlling an automated welding apparatus having a rotatable torch, said control system including means for controlling the rotation of said rotatable torch in response to said signals indicative of the configuration of said undercut.

13. A weld analysis and control system for receiving, storing and disseminating predetermined parameters of a weld, for tracking an indicia on a material to be welded, for monitoring and recording the desired track and weld configurations during operation of the system, for comparing the desired track and weld parameters to the actual track and weld configuration of a weld as the weld is formed upon the material, and for controlling a welding device in response to the comparison of the desired track and weld parameters to the actual weld as it is formed on the material, said system comprising:
    means for receiving storing and disseminating said predetermined parameters of a weld;
    means for receiving information relating to said desired parameters and for transmitting parametric signals in response thereto;
    means for tracking said indicia on said material to be welded;
    means for providing tracking signals in response to said tracking;
    means for receiving said tracking signals and said parametric signals and for controlling said welding device in response thereto;
    means for monitoring and recording the actual tracking and the characteristics of the weld performed by said welding device as the weld is formed.

14. A system as set forth in claim 13 and further including means for comparing the desired track and weld parameters to the actual track and weld configuration of a weld as the weld is formed upon the material, and for controlling a welding device in response to the comparison of the desired track and weld parameters to the actual weld as it is formed on the material.

15. A system as set forth in claim 14 wherein said parameters include mismatch, peaking, undercut, underfill, crown height, weld width, puddle diameter, and puddle symmetry.

* * * * *